United States Patent
Lim

(10) Patent No.: US 8,920,531 B2
(45) Date of Patent: Dec. 30, 2014

(54) DEVICE FOR REDUCING SOOT PARTICLES AND METHOD FOR THE SAME

(75) Inventor: In-Gweon Lim, Seongnam-si (KR)

(73) Assignee: CA Tech Inc., Gyeonggi-Do (KR)

( * ) Notice: Subject to any disclaimer, the term of this patent is extended or adjusted under 35 U.S.C. 154(b) by 0 days.

(21) Appl. No.: 13/578,352

(22) PCT Filed: Dec. 10, 2010

(86) PCT No.: PCT/KR2010/008834
§ 371 (c)(1),
(2), (4) Date: Aug. 10, 2012

(87) PCT Pub. No.: WO2011/102596
PCT Pub. Date: Aug. 25, 2011

(65) Prior Publication Data
US 2012/0304861 A1 Dec. 6, 2012

(30) Foreign Application Priority Data
Feb. 18, 2010 (KR) .................. 10-2010-0014667

(51) Int. Cl.
| | | |
|---|---|---|
| B01D 39/14 | (2006.01) | |
| B01D 39/06 | (2006.01) | |
| B01D 39/20 | (2006.01) | |
| B01D 24/00 | (2006.01) | |
| B01D 50/00 | (2006.01) | |
| F01N 13/00 | (2010.01) | |
| F01N 3/022 | (2006.01) | |

(52) U.S. Cl.
CPC ........... *F01N 3/0222* (2013.01); *F01N 2330/06* (2013.01); *F01N 13/017* (2013.01); *F01N 3/0224* (2013.01); *F01N 13/0093* (2013.01); *Y02T 10/20* (2013.01)
USPC ................ 55/523; 55/522; 55/524; 422/169; 422/170; 422/171; 422/172; 422/177; 422/178; 422/179; 422/180; 422/181

(58) Field of Classification Search
USPC ............. 55/522–524; 422/169–172, 177–182
See application file for complete search history.

(56) References Cited

U.S. PATENT DOCUMENTS 2,288,943 A * 7/1942 Eastman ........................ 422/171
2,396,190 A * 3/1946 Morgan et al. ................. 423/248
(Continued)

FOREIGN PATENT DOCUMENTS

| CN | 200940503 | 8/2007 |
| DE | 20 2005 011 6 | 1/2007 |

(Continued)

OTHER PUBLICATIONS

PCT/KR2010/008834 International Search Report and Written Opinion, mailed Mar. 14, 2011, 11 pages—English.

(Continued)

*Primary Examiner* — Amber Orlando
(74) *Attorney, Agent, or Firm* — Andrew F. Young, Esq.; Lackenbach Siegel, LLP

(57) ABSTRACT

The present invention relates to device and method for reducing soot particles.
The device for reducing soot particles includes a first filter provided to an exhaust gas flow passage through which exhaust gas from a diesel engine flows to have a predetermined volume of a plurality of grains to be operated as a volumetric filtration system, and a second filter provided to a predetermined position of the second filter to be operated as a surface filtration system.

9 Claims, 6 Drawing Sheets

(56) References Cited

U.S. PATENT DOCUMENTS

| | | | |
|---|---|---|---|
| 3,018,841 A * | 1/1962 | Gerlich | 181/258 |
| 3,733,181 A * | 5/1973 | Tourtellotte et al. | 422/171 |
| 3,815,337 A * | 6/1974 | Lenane | 96/386 |
| 3,960,510 A * | 6/1976 | Sergeys | 422/171 |
| 3,960,528 A * | 6/1976 | Jacobs et al. | 55/346 |
| 4,056,934 A * | 11/1977 | Mizusawa et al. | 60/311 |
| 4,074,975 A * | 2/1978 | Tokura et al. | 422/171 |
| 4,106,913 A * | 8/1978 | Bunda et al. | 422/180 |
| 4,299,600 A * | 11/1981 | Kobashi | 96/403 |
| 4,830,833 A * | 5/1989 | Shaff | 422/172 |
| 5,316,738 A * | 5/1994 | Kojima et al. | 422/180 |
| 5,367,131 A * | 11/1994 | Bemel | 181/232 |
| 5,403,559 A * | 4/1995 | Swars | 422/171 |
| 5,707,593 A * | 1/1998 | Wang | 422/171 |
| 5,916,133 A * | 6/1999 | Buhrmaster et al. | 60/297 |
| 6,293,096 B1 * | 9/2001 | Khair et al. | 60/286 |
| 6,428,755 B1 * | 8/2002 | Rao et al. | 422/180 |
| 6,680,037 B1 * | 1/2004 | Allansson et al. | 423/215.5 |
| 6,718,757 B2 * | 4/2004 | Khair et al. | 60/286 |
| 6,770,252 B2 * | 8/2004 | Cheng | 423/239.1 |
| 6,968,681 B2 * | 11/2005 | Stephani et al. | 60/297 |
| 7,041,159 B2 * | 5/2006 | Entezarian et al. | 96/135 |
| 7,247,185 B2 * | 7/2007 | Jobson et al. | 55/523 |
| 7,320,723 B2 * | 1/2008 | Sewell, Sr. | 55/512 |
| 7,462,340 B2 * | 12/2008 | Schwefer et al. | 423/239.1 |
| 7,552,585 B2 * | 6/2009 | Rigaudeau et al. | 60/295 |
| 7,914,748 B2 * | 3/2011 | Yoshida et al. | 422/177 |
| 7,964,154 B2 * | 6/2011 | Makkee et al. | 422/171 |
| 8,015,802 B2 * | 9/2011 | Nishiyama et al. | 60/286 |
| 8,071,037 B2 * | 12/2011 | Harinath et al. | 422/177 |
| 8,153,072 B2 * | 4/2012 | Klingberg | 422/177 |
| 2005/0147541 A1 * | 7/2005 | Ajisaka et al. | 422/177 |
| 2006/0153748 A1 * | 7/2006 | Huthwohl et al. | 422/172 |
| 2007/0196248 A1 * | 8/2007 | Mizutani | 422/180 |
| 2008/0286166 A1 * | 11/2008 | Heidenreich | 422/177 |
| 2010/0028221 A1 * | 2/2010 | Takaya et al. | 422/180 |

FOREIGN PATENT DOCUMENTS

| | | |
|---|---|---|
| GB | 2 342 055 | 4/2000 |
| JP | 2006-057614 | 3/2006 |
| KR | 10-2003-0076980 | 9/2003 |
| KR | 10-2009-0085352 | 8/2009 |
| KR | 10-2009-0108012 | 10/2009 |
| WO | WO 2008/138146 | 11/2008 |
| WO | WO 2011/102596 | 8/2011 |

OTHER PUBLICATIONS

JP 2006-057614A—Office Action dated Aug. 5, 2011, 4 pages Korean; 3 pages—English.

KR 10-2010-0014667 Notice of Allowance dated Jul. 3, 2012, 2 pages—Korean; 1 page—English.

\* cited by examiner

DEVICE FOR REDUCING SOOT PARTICLES AND METHOD FOR THE SAME

CROSS REFERENCE TO RELATED APPLICATIONS

This application claims priority to International PCT Ser. No. PCT/KR2010/008834filed Dec. 10, 2010, the entire contents of which are incorporated herein fully by reference, which in turn claims priority to KR Ser. No. 10-2010-0014667, filed on Feb. 18, 2010.

TECHNICAL FIELD

The present invention relates to device and method for reducing soot particles, and more particularly, to device and method for reducing soot particles, which can reduce pollutant emission from combustion apparatuses, such as diesel engines, effectively.

BACKGROUND ART

Currently, use of diesel engines increases day by day, making the pollutant emission from the diesel engines to cause various environmental problems. In exhaust gas from the diesel engines, not only nitrogen oxides NOx and sulfur oxides SOx, but also fine particles (for convenience's sake, will be called as "soot particles"), cause problems. Therefore, in order to prevent the soot particles from emitting to the air, a soot particle collecting filter is mounted to an exhaust gas flow passage for collecting the soot particles which are solid particles to be emitted to an outside of the combustion apparatus, and regenerated, periodically or continuously. At the time of regeneration of the filter, the soot particles collected at the filter is burned and discharged as a gaseous substance, for making the filter to return to an initial state.

Presently, as the soot particle reducing systems, there are two systems in use, having shapes of soot collection filters and collection characteristics different from each other. That is, one is a system in which the soot particles are filtered by a filter having a large surface with holes smaller than a size of the soot particle (hereafter called as a "Surface filtration system") and the other one is a system in which a filter having a stack of a predetermined volume of grains, such as a plurality of metal or ceramic beads, collects the soot particles throughout entire volume (a "Volumetric filtration system"). In the volumetric filtration system, the soot particles deposit on a boundary surface between the grains and pores in a course the exhaust gas containing the soot particles pass through grain layers.

Referring to FIGS. 1 and 2, the surface filtration system uses a filter having a fixed shape and structure, such as a honeycomb shaped ceramic carrier filter, a metal mesh filter, and a filter fabricated by weaving or sintering high temperature fiber or ceramic fiber (hereafter called as a "structured filter"). Though the surface filtration system has an excellent soot collection performance, the surface filtration system has weak mechanical and thermal durability due to properties of the ceramic and metal of the filter. Moreover, since the surface filtration system requires a structure having a large surface area for reducing an initial back pressure, most of the surface filtration systems have a honeycomb shape, and are expensive. And, if emission of the soot particles is great and if the soot particles collected is great, since holes through which the exhaust gas flows become the smaller gradually, the structured filter causes sharp increase of the back pressure, impeding smooth operation of the engine.

FIGS. 1 and 2 illustrate a filter of cordierite, and a ceramic filter of silicon carbide, which are used the most as the structured filter up to now, respectively. The filters have problems in high temperature durability, and high temperature thermal expansion. The cordierite ceramic structured filter has problems in a low allowable temperature gradient and durability coming from melting at a high temperature. In order to overcome those problems, a ceramic filter of the silicon carbide which can endure at a high temperature is used mostly. However, the silicon carbide ceramic filter has a high thermal expansion coefficient, and has a problem of a temperature gradient at a high temperature. Therefore, a whole filter 2 can not be fabricated as one unit, but small filter segments 20 are combined to complete the whole filter 2. Thus, the silicon carbide ceramic filter has a deep-seated trouble in which the filter cracks and damaged easily due to a bonding material (See FIG. 3). In order to improve the problems of the surface filtration system, U.S. Pat. Nos. 3,937,015, 4,912,076, 4,759,918, 5,497,620, 4,535,589, and 4,852,349 are suggested. Basically, above patents suggest the surface filtration system.

In order to solve the problems of the surface filtration system described above, the applicant developed devices and methods for reducing the soot particles, of the volumetric filtration system, and filed a plurality of patents (Korea Patent Application Nos. 10-2000-3814, 10-2001-39523, 10-2002-1902, 10-2005-92078, and so on). As can be known from FIG. 4, in the volumetric filtration system, a plurality of grains 210, such as metal/ceramic beads, are stacked to make the filter (hereafter "grain layer filter" for convenience's sake) to have a predetermined volume, for collecting the soot particles with an entire volume. That is, the grain layer filter embodies a volumetric filtering mechanism as the soot particles deposit at a boundary surface between the grains and pores of the filter in a course the gas carrying the soot particles passes through the grain layer. The grain layer filter has no stress caused by a thermal gradient in the filter, an excellent durability with respect to a high temperature environment and mechanical vibration, a very low back pressure increasing rate, and a very excellent economic aspect. However, in comparison to the structured filter having the same or almost same volume, the grain layer filter has a drawback in that an initial back pressure is very high resulting in a large filter volume for overcoming the problem of the initial back pressure. Moreover, in order to obtain a high level of soot particle collection efficiency in the volumetric filtration system, the grain layer filter requires having a large volume. In conclusion, development of device and method for reducing soot particles are required for solving the drawbacks both of the structured filter and the grain layer filter while maintaining advantages thereof.

DISCLOSURE OF INVENTION

Technical Problem

To solve the problems, an object of the present invention is to provide improved device and method for reducing soot particles.

Technical Solution

To achieve these objects and other advantages and in accordance with the purpose of the invention, as embodied and broadly described herein, device and method for reducing soot particles are provided in which concepts, of a structured filter which has predetermined shape and structure to collect soot particles with a surface filtration system mostly and a grain layer filter having various shapes of grains for collecting the soot particles with a volumetric filtration system, are made to supplement each other to supplement drawbacks of the systems and maximize advantages of the systems, for providing more efficient and durable device and method for reducing soot particles.

For this, a device for reducing soot particles includes a first filter provided to an exhaust gas flow passage through which exhaust gas from a diesel engine flows to have a predetermined volume of a plurality of grains to be operated as a volumetric filtration system, and a second filter provided to a predetermined position of the second filter to be operated as a surface filtration system. It is preferable that the first filter is a grain layer filter, and the second filter is a structured filter. It is preferable that the second filter has a volume relatively smaller than a volume of the first filter.

Preferably, the second filter is provided parallel to a flow direction of the exhaust gas, and the second filter can be provided to the first filter extended from an inlet portion to an outlet portion of the first filter, and the second filter can be provided in the first filter separated in multiple stages in the first filter. Of course, the first filter and the second filter can be provided in the flow direction of the exhaust gas in succession.

In the meantime, preferably, the device can further include a holding portion for holding the first filter. And, more preferably, the second filter is held by the grains of the first filter.

In the meantime, the second filter can include small sized filter segments coupled together.

In another aspect of the present invention, a method for reducing soot particles includes the step of filtering soot particles in exhaust gas from a diesel engine by a combination of a surface filtration system and a volumetric filtration system which has a predetermined volume of a plurality of grains. Preferably, the step includes the step of collecting the soot particles by the surface filtration system at an initial stage, mostly.

Advantageous Effects

The device and method for reducing soot particles of the present invention have following advantageous effects.

First, the placing of the structured filter and the grain layer filter in the same filter volume (or space) permits to solve the problems of the initial back pressure and initial filtering efficiency of the grain layer filter.

Second, the problems of the mechanical and thermal durability of the structured filter can be solved while maintaining advantages of the structured filter.

Third, the back pressure condition and the filter efficiency can be optimized to various sizes of the diesel engines and operation conditions if unit element of the structured filter, i.e., the number of the segments, is taken into account as a design factor, and by utilizing which a size of the filter which is practically applicable can be made smaller and production economy of the filter can be enhanced.

BEST MODE

Reference will now be made in detail to the specific embodiments of the present invention, examples of which are illustrated in the accompanying drawings.

Figure 1:
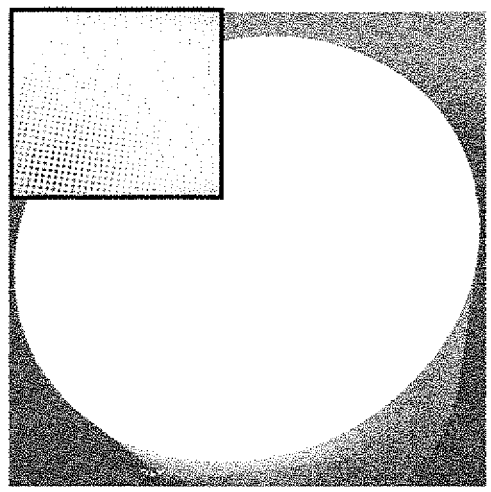
FIGS. 1 and 2 illustrate photographs of a filter of cordierite, and a ceramic filter of silicon carbide, which are related art structured filters, respectively.
Figure 2:
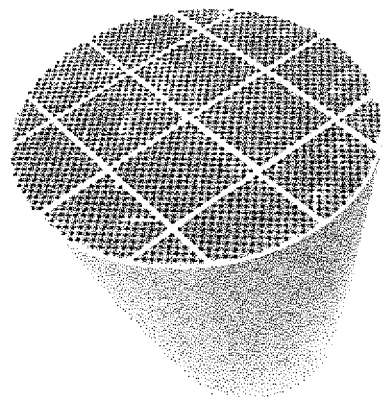
Figure 3:
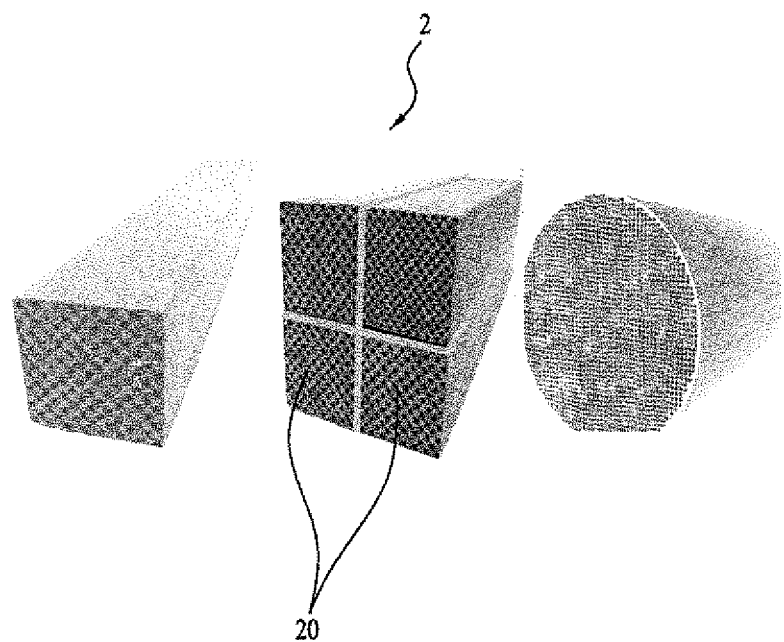
FIG. 3 illustrates photographs of segments of a related art structured filter, respectively.
Figure 4:
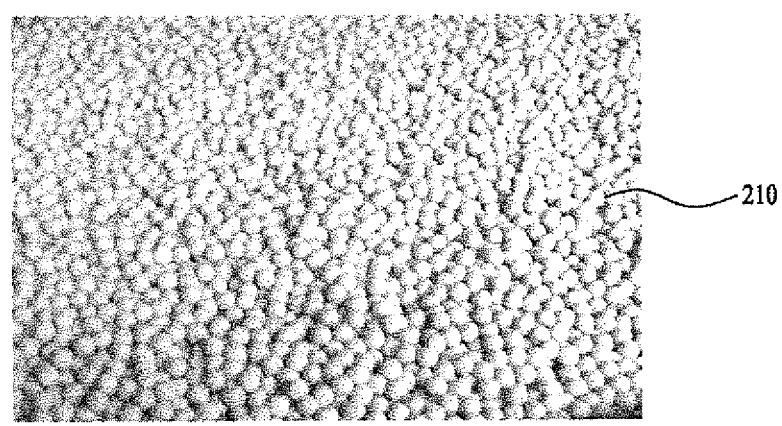
FIG. 4 illustrates a photograph of a related art grain layer filter.
Figure 5:
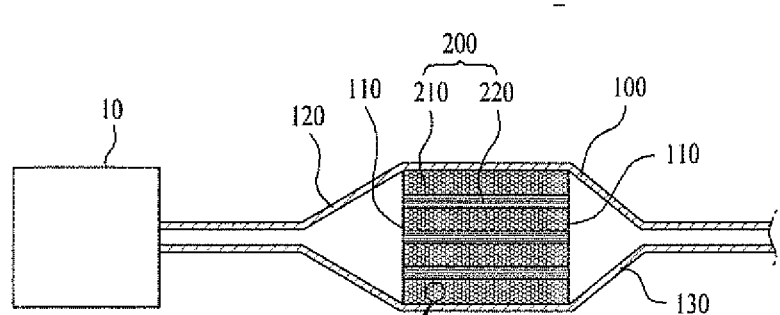
FIG. 5 illustrates a schematic view of a device for reducing soot particles in accordance with a preferred embodiment of the present invention.
Figure 5:
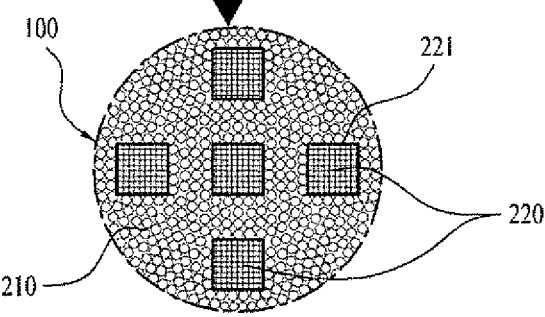
Figure 6:
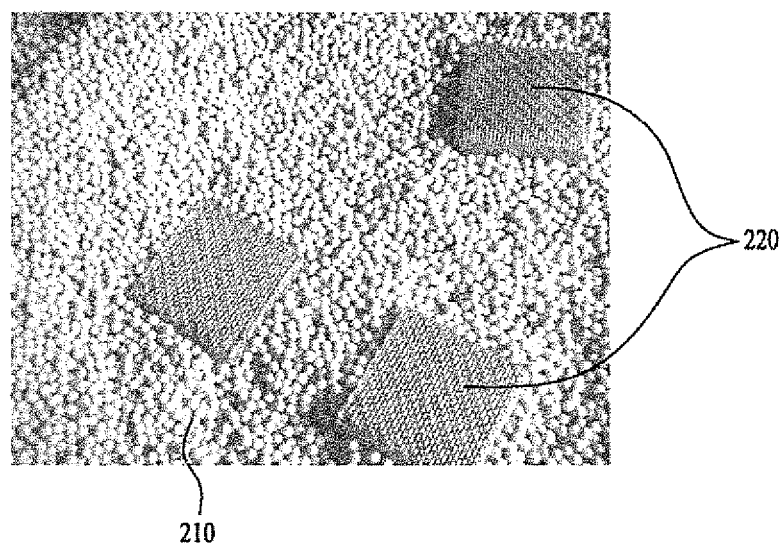
FIG. 6 illustrates a photograph of an inlet portion to the filter in FIG. 5.

A device for reducing soot particles in accordance with a preferred embodiment of the present invention will be described, with reference to FIGS. 5 and 6.

Since the surface filtration system has a filtration mechanism different from the volumetric filtration system in the related art, there have been many researches for improvement of the surface filtration system and the volumetric filtration system respectively for solving above problems. However, according to researches of the inventor, it is marvelous to discover that the drawbacks of the two filtering systems can be supplemented while maintaining the advantages of the two filtering systems if the surface filtration system structured filter and the volumetric filtration system grain layer filters are combined (Details will be described later). That is, the device 1 for reducing soot particles in accordance with a preferred embodiment of the present invention has a combination of the surface filtration system and the volumetric filtration system.

This will be described in detail. The device 1 for reducing soot particles is provided to an exhaust gas flow passage through which exhaust gas from a diesel engine 10 flows. A housing 100 which forms an exterior of the device 1 has a first filter 210 and a second filter 220 provided thereto. And, it is preferable that a holding portion 11D having a low flow resistance characteristic is provided to a predetermined position for holding the first filter 210 and the second filter 220 against an exhaust gas flow. It is preferable that an inlet portion 120 is a reduction-expansion it is apparent that other appropriate shapes can be used. And, in order to protect the second filter 220 or the filter segments, it is preferable that the second filter 220 is surrounded with coarse metal mesh 221.

The holding portion 110 will be described. It is preferable that the holding portion 110 can hold the first filter 210 and the second filter 220 against the exhaust gas flow and has a low flow resistance. For an example, the holding portion 110 can be a punched plate shape having a plurality of holes, or a woven mesh shape, or a diaphragm. Of course, it is preferable that the holding portion 110 is formed of a material that can endure a high temperature. Though the holding portion 110 can hold both the first filter 210 and the second filter 220, it is preferable that the holding portion 110 is mounted to a front end and a rear end of the first filter 210 having the plurality of grains for holding the first filter 210 only, while the second filter 220 is held by the grains of the first filter 210. Because the second filter 220 is liable to be damaged by thermal expansion if the second filter 220 is restrained by the holding portion 110 in the high temperature environment like the case of filter regeneration. As an example of such a case, the second filter 220 can be made shorter than the first filter 210 so that the front and rear ends of the second filter 220 are not in contact with the holding portion 110 while the second filter 220 is held by the grains of the first filter 210.

Figure 7:
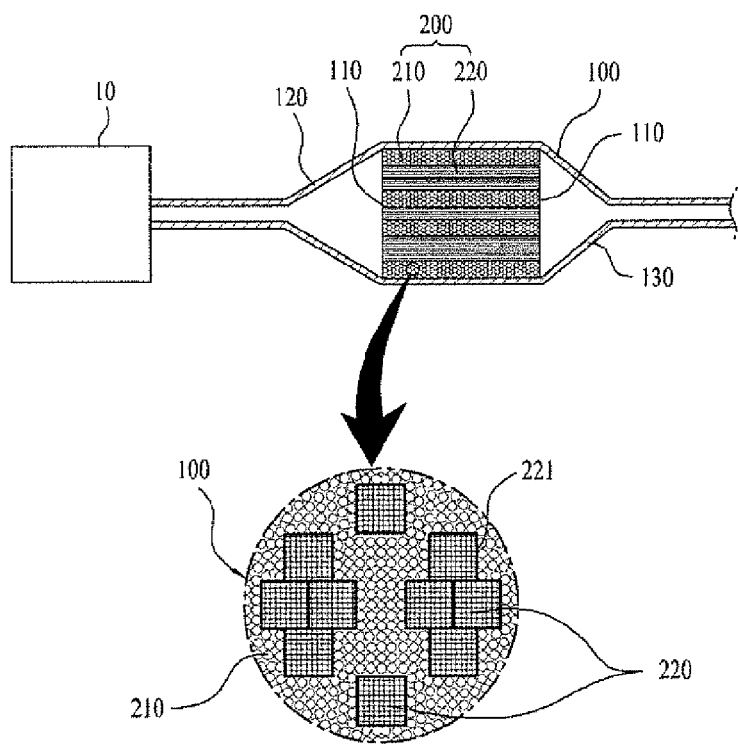
FIG. 7 illustrates a schematic view of a device for reducing soot particles in accordance with another preferred embodiment of the present invention.

A device for reducing soot particles in accordance with another preferred embodiment of the present invention will be described in detail with reference to FIG. 7. The embodiment has a principle the same with the foregoing embodiment. However, the embodiment suggests fabricating a larger second filter 22D by coupling a plurality of structured filter segments.

Figure 8:
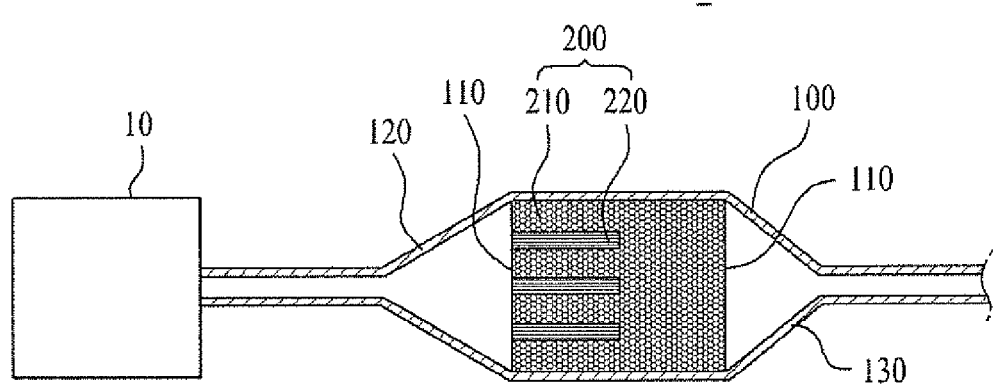
FIGS. 8 and 9 illustrate schematic views each showing a device for reducing soot particles in accordance with another preferred embodiment of the present invention.
Figure 9:
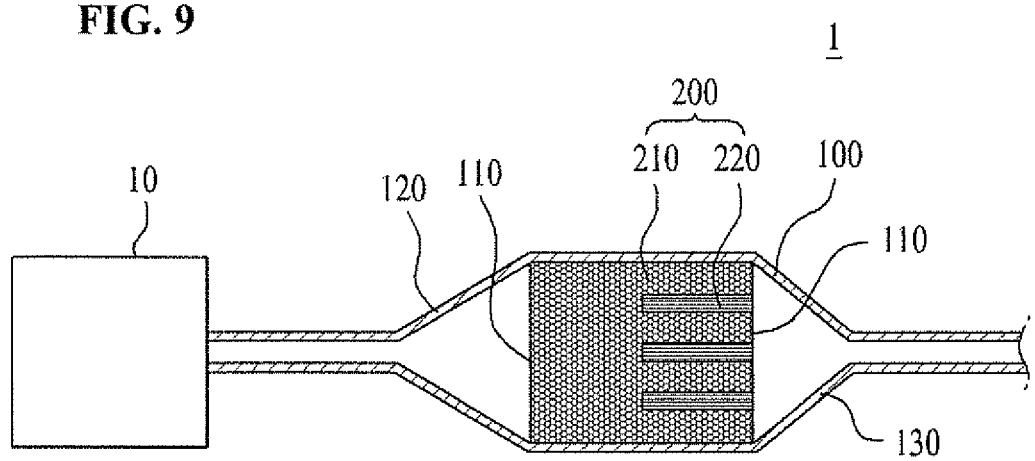
Figure 10:
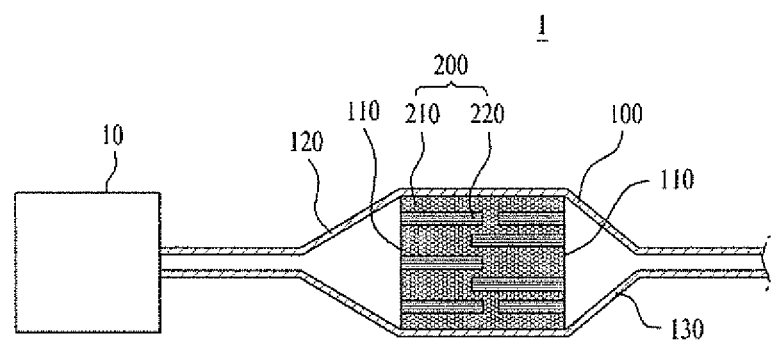
FIG. 10 illustrates a schematic view of a device for reducing soot particles in accordance with another preferred embodiment of the present invention.

A device for reducing soot particles in accordance with another preferred embodiment of the present invention will be described in detail with reference to FIGS. 8 and 9. The embodiment also has a principle the same with the foregoing embodiment. However, the embodiment suggests a system in which the second filter 220 is separated in the first filter 210 in multiple stages such that the second filter 220 is seen differently at the inlet portion and the outlet portion. FIG. 8 illustrates the second filter 220 mounted to an inlet portion side of the first filter 210 mostly, and FIG. 9 illustrates the second filter 220 mounted to an outlet portion side of the first filter 21D mostly. And, FIG. 10 illustrates the second filter 220 mounted both to the inlet portion side and the outlet portion side of the first filter 210.

Figure 11:
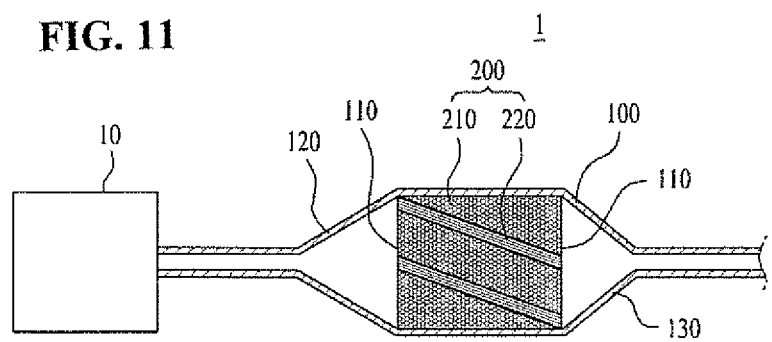
FIG. 11 illustrates a schematic view of a device for reducing soot particles in accordance with another preferred embodiment of the present invention.

A device for reducing soot particles in accordance with another preferred embodiment of the present invention will be described in detail with reference to FIG. 11. The embodiment also has a principle the same with the foregoing embodiment. However, the embodiment suggests a system in which the second filter 220 is mounted, not parallel to the flow direction of the exhaust gas substantially, but with a slope.

Figure 12:
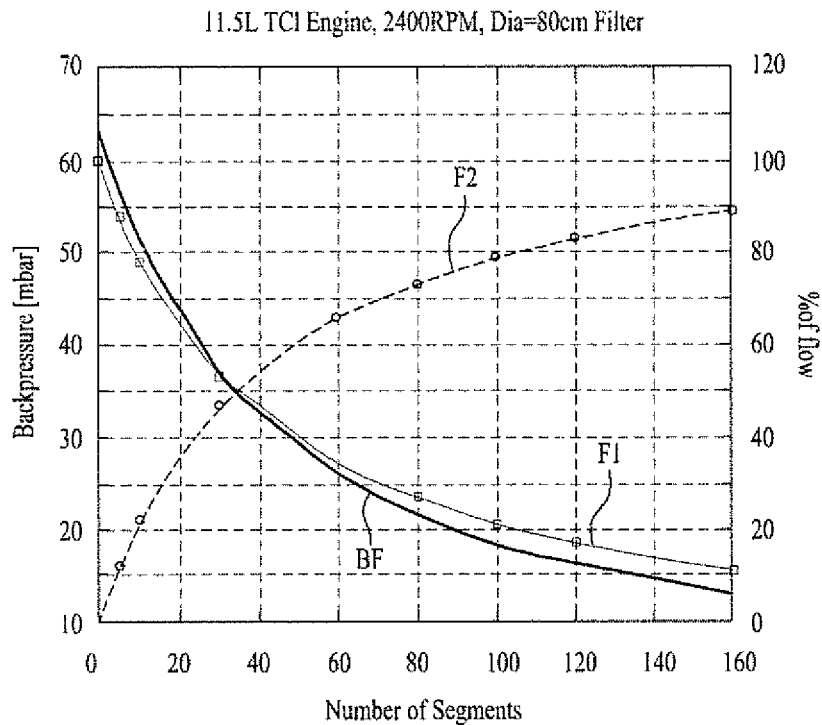
FIG. 12 illustrates a graph showing a number of structured filters versus a flow rate ratio and a back pressure in a device for reducing soot particles of the present invention.

The principle of the device and method for reducing soot particles of the present invention will be described with reference to FIG. 12. FIG. 12 illustrates a graph showing a number of the second filters (The segments) 220 versus a flow rate ratio and a back pressure of the first filter 210 and the second filter in a device for reducing soot particles of the present invention. F1 denotes the flow rate ratio passing through the first filter 210, F2 denotes a flow rate ratio passing through the second filter 220, and BF denotes the back pressure. As can be known from FIG. 12, it can be known that, if the device for reducing soot particles has the first filter 210 only (i.e., a number of the segments of the second filter are "0"), entire flow takes place through the first filter 210, and an initial back pressure is kept to be about 60 mbar. However, it can be known that, if the number of the second filters 220 increases, the flow rate ratio F1 through the first filter 210 reduces, while the flow rate ratio F2 through the second filter 220 increases. Moreover, it can be known that the reduction of the back pressure is distinctive if the number of the second filters 220 increases. For an example, it can be known that, if the number of the second filters 220 is 160, the back pressure is 15 mbar. It is considered that this is because, the greater the number of the second filters 220, a substantial amount of the flow flows to the second filters 220 which have a comparatively low flow resistance. If the number of the structured filter segments increases, an overall filter back pressure is reduced, while increasing filter filtration efficiency further. If the number of the structured filter segments can be increased to infinity, this can be a case the same with the structured filter having the same volume.

Figure 13:
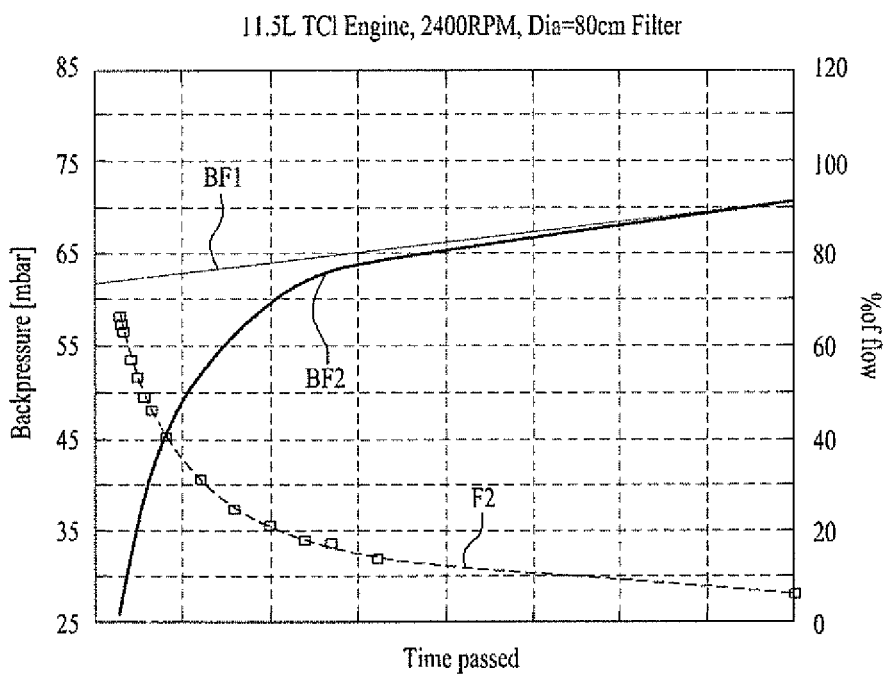
FIG. 13 illustrates a graph showing a back pressure versus a time period in a device for reducing soot particles of the present invention.

The present invention utilizes such a principle. This will be described with reference to FIG. 13. FIG. 13 illustrates a graph showing a back pressure versus a time period in a device for reducing soot particles of the present invention, in which the first filter 210 and the second filter 220 are combined. F2 denotes a flow rate ratio flowing through the second filter 220. And, BF2 denotes the back pressure in the device for reducing soot particles formed as time passes, in which the first filter 210 and the second filter 220 are combined, and BF1 denotes the back pressure of the device for reducing soot particles of a sole volumetric filtration system, i.e., when only the first filter 210 is used.

If the diesel engine emits the exhaust gas, the exhaust gas is introduced to the device for reducing soot particles. An entire exhaust gas flow can be divided into an exhaust gas flow passing through the first filter 210 portion and the other exhaust gas flow passing through the second filter 220 portion. And, the back pressure on the device for reducing soot particles, particularly, on the filter, is determined by a flow speed (a flow rate) and a temperature of the exhaust gas passing through the filter portion, mostly. As can be known from FIG. 13, initially, a substantial portion of the flow, about 68% of a flow rate, flows through the second filter 220. Because a flow resistance of the first filter 210 is greater than the flow resistance of the second filter 220, the substantial portion of the exhaust gas flow passes through the second filter 220, resulting in reduction of the flow rate and flow speed of the exhaust gas passing through the first filter 210, to reduce an overall back pressure of the device for reducing soot particles and to increase filtering efficiency of the filter.

In the meantime, as time passes, an amount of the soot particles collected at the second filter 220 portion increases, increasing the flow resistance at the second filter 220 portion gradually and reducing a flow rate passing through the second filter 22D. Though the flow rate reduction at the second filter 220 portion means the flow rate increase flowing through the first filter 210, since the first filter 210 is the grain layer filter, the back pressure increase of the first filter 210 is very slow in view of a nature of the grain layer filter.

In summary, though the device for reducing soot particles of the present invention has an initial pressure of about 26 mbar, if only the first filter 210, i.e., the volumetric filtration system, is used, the initial back pressure is about 62 mbar which is very high. As time passes, the back pressure is almost the same with the case when only the first filter 210 is used. That is, the device for reducing soot particles of the present invention can solve the problem of the initial back pressure of the volumetric filtration system device for reducing soot particles. Eventually, it can be known that the device for reducing soot particles of the present invention is a very good method for solving the problem of the initial back pressure and the problem of the initial efficiency caused thereby of the first filter 210.

In the meantime, though the present invention suggests using the second filter 220 which is the structured filter, the drawback of the second filter 220 can also be solved. As described before, in view of the filtration characteristic and the back pressure characteristic, a major problem of the structured filter is requirement for increasing an area of the filter if it is intended to reduce a back pressure increase rate which increases as the soot particles are collected. And, at the time of regeneration of the filter, prevention of a thermal impact and maintaining a low temperature gradient at an inside of the filter are very important. Accordingly, at the time of regeneration of the filter, it is required to heat the filter slowly and uniformly for maintaining a structure and a performance of the filter. And, if the filter has an external portion that restrains the filter, a function of the filter can fail due to a crack caused by expansion at a high temperature.

In the meantime, even though the present invention uses a structured second filter 220, the present invention can solve above problem. The reason is as follows. At the time of regeneration of the device for reducing soot particles, a high temperature flow passes through the device for reducing soot particles. In this case, the back pressure on the device for reducing soot particles increases further due to an increased flow compared to a time just before the regeneration. And, at the time of the regeneration, a greater portion of the flow passes through the first filter 210 different from the time of the soot particle collection. This is because the first filter 210, i.e., the grain layer filter, has a low back pressure increase rate even if the first filter 210 collects much soot particles therein, and the second filter 220, i.e., the structured filter, has a very high back pressure increase rate in a state the second filter 220 has collected much soot particles therein. In the meantime, since the first filter 210 has a relatively great volume, pass of the high temperature flow through the first filter 210 means a uniform temperature formed throughout the device for reducing soot particles, enabling to reduce sharp rise of the temperature of the second filter 220, accordingly. And, even if a temperature of the second filter 220 portion rises sharply due to combustion of the soot particles at the second filter 220, as heat generated thus is transmitted even to the first filter 210, the temperature gradient can become very small, quickly. Eventually, since the device for reducing soot particles of the present invention permits to prevent thermal impact from taking place at the time of regeneration and to maintain a low temperature gradient in the filter, enabling to heat the second filter 220 slowly, the damage to the second filter 220 can be prevented.

That is, like the device for reducing soot particles of the present invention, if the structured filter is placed in the grain layer filter, the grain layer filter has a very good advantage of securing the filter durability perfectly even if the filter temperature is elevated sharply at the time of regeneration of the grain layer filter, and an advantage of a very good heat distribution characteristic. If the structured filter (Segments) which has a relatively small volume and small thermal capacity is placed in the grain layer filter having a good temperature homogenizing characteristic, the grain layer filter can absorb thermal expansion and contraction of the structured filter segments, thereby permitting to prevent the damage to the structured filter segments caused by the thermal impact from taking place from a source thereof.

In the meantime, since device for reducing soot particles of the present invention can hold the second filter with the grains of the first filter 210, enabling to hold the second filter 220 without any external restrain, the failure of the filter function caused by cracking coming from high temperature expansion of the second filter 220 can also be prevented.

In the meantime, the device and method for reducing soot particles of the present can optimize the back pressure condition and the filter efficiency to various sizes of the diesel engines and operation conditions if unit element of the structured filter, i.e., the number of the segments, is taken into account as a design factor.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A recyclable device for reducing soot particles from an exhaust gas of a diesel engine, said device comprising:
    a housing connected to a diesel engine, the housing including an inlet portion and an outlet portion;
    a first filter for serving as a volume filter, the first filter comprising a plurality of grains provided in the housing; and
    one or more a second filters for serving as a surface filter, the one or more second filters being micro-porous and provided within the plurality of grains of the first filter for allowing multiple exhaust gas flow pathways.

2. The device as claimed in claim 1, wherein an inlet of the first filter is connected to the inlet portion of the housing and an inlet of the second filter is proximate to the inlet portion of the housing.

3. The device as claimed in claim 1, wherein each one of the one or more second filters has a volume generally smaller than a volume of the first filter.

4. The device as claimed in claim 1, wherein the one or more second filters are provided generally parallel to a flow direction of the exhaust gas.

5. The device as claimed in claim 4, wherein the one or more second filters are provided so as to extend approximately from an inlet of the first filter to an outlet of the first filter.

6. The device as claimed in claim 1, further comprising: a holding portion for holding the first filter.

7. The device as claimed in claim 6, wherein the second filter is substantially fixed in position by the grains of the first filter.

8. The device as claimed in claim 1, wherein the second filter includes small sized filter segments coupled together by a coarse metal mesh.

9. A method for reducing soot particles of an exhaust gas of a diesel engine, comprising the steps of:
    filtering the soot particles by volumetric filtration;
    filtering the soot particles by surface filtration; and
    burning the soot particles collected in the volumetric filtration step and the surface filtration step;
    wherein the volumetric filtration step and the surface filtration step are performed concurrently.

* * * * *